Figure 1:
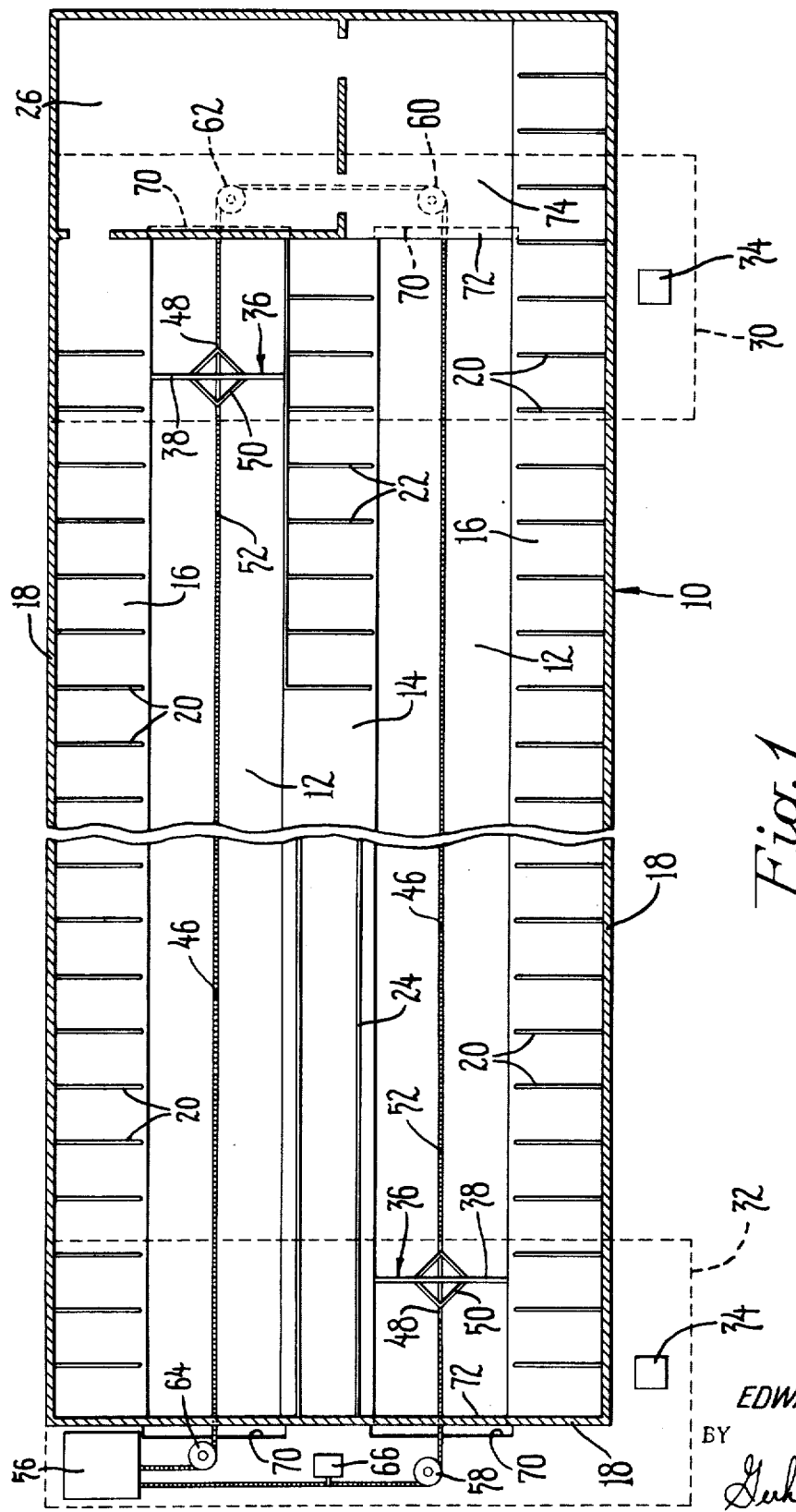

United States Patent
Thoennes

[15] 3,693,782
[45] Sept. 26, 1972

[54] LIVESTOCK CONFINEMENT AREA

[72] Inventor: Edward R. Thoennes, Parkers Prairie, Minn. 56361

[22] Filed: June 22, 1970

[21] Appl. No.: 48,394

[52] U.S. Cl.................198/224, 198/DIG. 18, 119/28
[51] Int. Cl...............................................B65g 25/08
[58] Field of Search ....119/28, 22, 16, 224; 198/221, 198/222, DIG. 18, 224

[56] References Cited

UNITED STATES PATENTS

| | | |
|---|---|---|
| 3,458,029 | 7/1969 | Allen et al. ............119/22 X |
| 2,970,567 | 2/1961 | Rubin.........................119/22 |
| 3,456,779 | 7/1969 | Andreae....................198/222 |
| 3,071,109 | 1/1963 | Pierre.......................119/22 |
| 3,240,323 | 3/1966 | Kitson .......................198/224 |

FOREIGN PATENTS OR APPLICATIONS 1,232,704   10/1960   France

*Primary Examiner*—Hugh R. Chamblee
*Attorney*—Gerhardt, Greenlee & Farris

[57] ABSTRACT

A mechanized self-cleaning livestock confinement area including a pair of spaced longitudinally extending livestock areas and a depressed flat alley extending between the livestock areas. An opening is provided at each end of the alley to form a manure drop. A scraper extends across the width of the alley between the livestock areas. The scraper includes a guide member which is perpendicular to the scraper blade and runs in a groove in the bottom of the alley. A continuous chain runs in the groove and is attached to the guide member. The chain is driven to reciprocate the scraper back and forth to first scrape manure into the manure drop at one end of the alley and then into the manure drop at the other end of the alley. The scraper can be reciprocated back and forth continuously or a control circuit with a timer can be provided to energize the scraper drive motor at predetermined times.

7 Claims, 2 Drawing Figures

LIVESTOCK CONFINEMENT AREA

This invention relates to a mechanized self-cleaning livestock confinement or housing area. More specifically, the invention is related to the floor construction of a confinement barn or shed and scrapers to keep the floor clean with a minimum amount of labor.

Most cattle are allowed to graze in a pasture or they are confined in a relatively large open lot. Cattlemen have realized for some time that there are more economical ways to care for cattle. In a pasture or an open lot cattle use a considerable amount of energy walking and control of flies and other insects which injure cattle is very difficult. If cattle are in any area of the world other than the tropics, they require a considerable increase in the amount of feed they eat in the winter months to keep warm. Also, the land taken by pastures and open feed lots could be put to better use raising grain and roughage.

By confining cattle to a shed or building, they do not get excess exercise. They can be protected from hot and cold weather, flies and insects can be practically eliminated and the space normally used by pastures and feed lots can be used to grow grain and roughage. However, where cattle are confined to a shed or building, the housekeeping problems become critical. In order to keep cattle healthy, the shed or barn must be kept clean. The manure handling problems associated with cattle in confined areas have been so great that very few installations have been built, even though there would appear to be very great economic advantages.

The livestock confinement area of this invention is kept clean automatically with little or no manual labor. In order to provide a clean and sanitary environment for cattle, the confinement area of this invention includes a pair of spaced longitudinally extending livestock areas and a depressed flat alley extending between the livestock areas and an opening adjacent to each end of the alley. A scraper extends across the width of the alley from one livestock area to the other. A drive means reciprocates the scraper back and forth along the length of the alley to alternately scrape manure into one and then the other of the openings. The drive means for the scrapers includes a continuous chain and a motor to reciprocate the chain back and forth. The control for the motor includes a reversing mechanism to change the direction of movement of the scraper. The control for the motor may also include a switch to stop the motor and a timer which will turn the motor on periodically and thereby move the scrapers to clean the floor at predetermined intervals of time.

Figure 2:
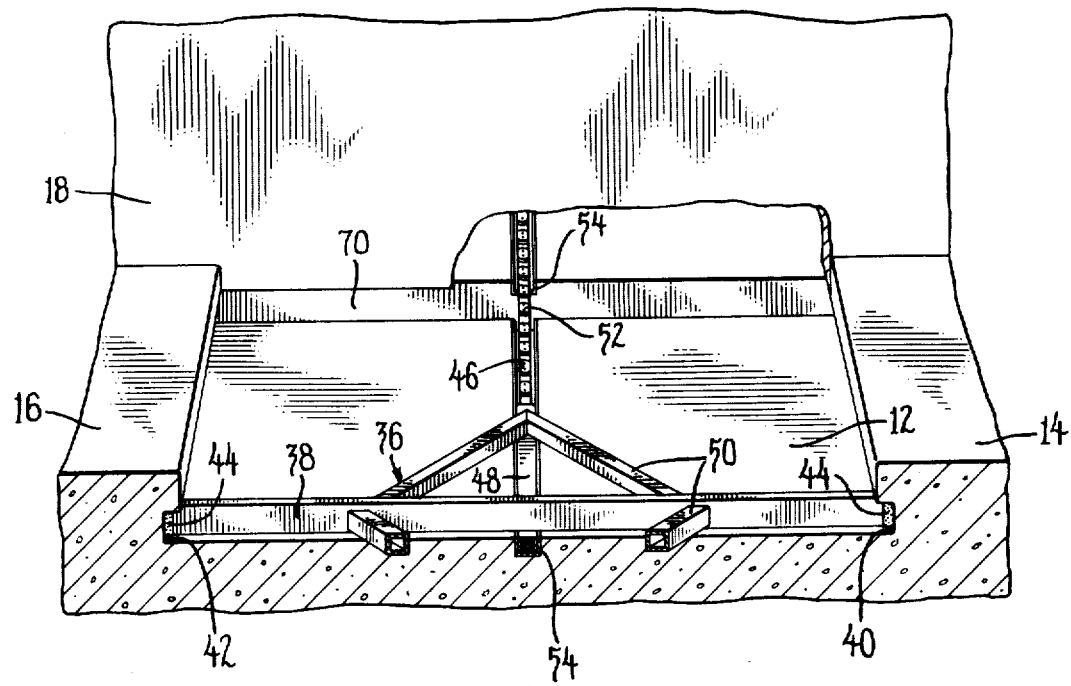

In order that the invention may be more fully understood, an embodiment will not be described with reference to the accompanying drawings in which:

FIG. 1 is a schematic plan view of the floor of the livestock confinement area of this invention and FIG. 2 is a perspective view showing the construction of the alleys and the scrapers.

The livestock confinement area 10 as shown in FIG. 1 includes two alleys 12. The alleys 12 are preferably about ten feet wide and extend substantially the full length of the confinement area pad 14 extends the length of the confinement area between the two alleys 12. A raised pad 16 extends the length of the livestock confinement area 10 adjacent to the outside edge of each of the alleys 12. A roof (not shown) covers the entire livestock confinement area 10. Walls 18 completely enclose the livestock confinement area 10. The walls 18 as well as the roof are preferably insulated. A ventilation system (not shown) is installed to cool the inside of the livestock confinement area 10 in the summer and to remove excess moisture in the winter. The body heat from livestock is generally sufficient to heat a well insulated building in the winter. If the installation were installed in a warm climate, it would not be necessary to insulate the walls 18. The walls 18 could be partially open or all open if desired. However, the roof would be necessary in any area to protect the cattle from sun and rain.

Stalls are provided on the pads 16 for individual animals by the dividers 20. Some stalls are also provided on the pad 14 between the alleys 12 for individual animals by the dividers 22. A feed bunk 24 is placed on a portion of the pad 14. Feed is distributed in the feed bunk 24 for the cattle by an automatic feeder which is not shown. A water trough (not shown) is preferably provided at one end of the feed bunk 24. When the installation is used for milk cows, a milking parlor 26 is preferably provided at one end of the livestock confinement area 10. When the milking parlor 26 is provided at one end of the livestock confinement area 10, the cows are never required to go outside. They remain in the building where the temperature is substantially constant the year around.

The installation includes two underground liquid manure pits 30 and 32. The liquid manure pit 30 extends under one end of both alleys 12. The liquid manure pit 32 extends under the other end of both alleys 12. Each of the liquid manure pits 30 and 32 include a cover 34 outside the livestock confinement area 10. The covers 34 are provided so that a pump may be lowered into each of the liquid manure pits 30 and 32 to agitate the manure in the pits and to pump the manure into a liquid manure spreader. Preferably each of the liquid manure pits 30 and 32 are large enough that it is only necessary to empty them in the spring and in the fall.

An opening 70 is provided at each end of both of the alleys 12. The opening 70 which forms a manure drop can be constructed in a number of different ways. The essential features of the openings 70 are that they be constructed so that cattle cannot get caught in the openings and so that manure will pass through the openings 70 and fall into one of the manure pits without plugging. As shown in FIG. 2, the opening 70 is in one of the vertical walls 18. The bottom of each alley 12 includes a lip 72 that extends past the vertical opening 70 and into the adjacent pit 30 or 32. The lips 72 prevent cattle from catching a leg in the opening. As shown in FIG. 1, one of the openings 70 is under a raised section of the floor 74 and not under a section of the walls 18.

At least one scraper 36 is provided to clean each alley 12. Each scraper 36 has a blade 38 which is preferably about 10 feet long. One end of each scraper rides in a groove 40 in the side of the pad 14. The other end of each scraper rides in a groove 42 in the side of the pad 16. A flexible member 44 is attached to each end of the blade 38 to scrape the vertical wall portions of the grooves 40 and 42. A groove 46 runs the length of each alley 12. The scraper 36 includes a guide member 48 that moves in the groove 46. The blade 38 is rigidly attached to the guide member 48. Angle braces 50 are connected to the blade 38 and the guide member 48. The scraper 36 is reciprocated back and forth in the alley 12 by a chain 52 which runs in the groove 46 and through the guide member 48 of the scraper 36. The chain 52 passes through the guide member 48 and is attached to the guide so that the scraper moves with the chain. The groove 46 in the floor for the guide member 48 and the chain 52 is preferably lined with steel channel members 54 to reduce wear on the chain 52. If desired, the steel channel member 54 could be on top of the floor of the alley 12.

The chain 52 is an endless chain driven by a drive sprocket inside the housing 56 for the motor and transmission. The chain 52 runs from the housing 56 to horizontal idler sprockets 58, 60, 62 and 64 and then back to the housing 56. Between the idler sprockets 58 and 60 the chain is guided and supported by the steel channel members 54 and the groove 46. An identical groove and channel support the chain 52 between the idler sprockets 62 and 64.

A limit switch 66 is provided to contact a lug on the chain when the scraper 36 approaches the manure drops. The scraper 36 is stopped short of the opening 70 by the limit switch 66 to prevent cattle from being injured by the scraper 36. The limit switch 66 can include a control circuit arranged to immediately reverse the motor and start the scrapers 36 moving in the opposite direction. The limit switch 66 can also stop the motor. When the limit switch 66 stops the motor a timer can be included in the control circuit to start the motor periodically to move the scrapers 36 in the opposite direction.

I claim:

1. A mechanized self-cleaning livestock confinement area including a pair of spaced longitudinally extending livestock areas and a depressed flat alley extending between said livestock areas, characterized by there being an opening adjacent to each end of said alley, a scraper extending across the width of said alley between the pair of livestock areas, drive means including chain means connected to the scraper intermediate its ends and motor means connected to reciprocate the chain means and attached scraper to move the scraper back and forth along the length of the alley to alternately scrape manure into one and then the other of said openings, means to hold the two free ends of the scraper adjacent to the bottom of the alley and wherein the alley has a groove formed therein extending the length of the same and wherein said chain means runs in the groove.

2. The mechanized self-cleaning livestock confinement area of claim 1 wherein a longitudinally extending guide member is attached to the scraper perpendicularly thereto, said guide member attached to the chain and running in said groove.

3. The mechanized self-cleaning livestock confinement area of claim 1 wherein the drive means includes a reversing mechanism to automatically reverse the direction of travel of the scraper.

4. The mechanized self-cleaning livestock confinement area of claim 1 wherein the drive means includes control means to stop the drive means when the scraper reaches a predetermined location in the alley, reversing mechanism to change the direction of movement of the scraper, and timer means for starting the drive at predetermined time intervals.

5. The mechanized self-cleaning livestock confinement area of claim 1 wherein a third longitudinally extending livestock area parallel to the pair of areas is separated from one of said pair by a second depressed flat alley, an opening adjacent to each end of said second alley, a second scraper extending across the width of said second alley, said drive means connected to move said second scraper back and forth along the length of said second alley to scrape manure into the openings adjacent the ends of said second alley.

6. The mechanized self-cleaning livestock confinement area of claim 5 wherein the drive means for the scrapers includes a continuous chain connected to each scraper and means to reciprocate the chain back and forth to cause movement of the first scraper in one direction while simultaneously causing movement of the second scraper in the opposite direction.

7. The mechanized self-cleaning livestock confinement area of claim 1 wherein manure holding pits are provided and said openings are connected to said pits.

* * * * *